United States Patent
Maeda

(10) Patent No.: US 11,505,200 B2
(45) Date of Patent: Nov. 22, 2022

(54) SYSTEM AND METHOD FOR VOICE COMMAND VEHICLE SYSTEMS CONTROL

(71) Applicant: TOYOTA JIDOSHA KABUSHIKI KAISHA, Toyota (JP)

(72) Inventor: Eiichi Maeda, Itabashi-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/060,357

(22) Filed: Oct. 1, 2020

(65) Prior Publication Data

US 2021/0171053 A1    Jun. 10, 2021

(30) Foreign Application Priority Data

Dec. 10, 2019    (JP) .............................. JP2019-222932

(51) Int. Cl.
*B60W 50/10*  (2012.01)
*B60W 50/08*  (2020.01)

(52) U.S. Cl.
CPC .......... *B60W 50/10* (2013.01); *B60W 50/087* (2013.01); *B60W 2540/045* (2020.02)

(58) Field of Classification Search
CPC ............... B60W 50/10; B60W 50/087; B60W 2540/045
See application file for complete search history.

(56) References Cited

U.S. PATENT DOCUMENTS

| | | | |
|---|---|---|---|
| 9,085,303 B2 * | 7/2015 | Wolverton | B60K 37/06 |
| 10,106,173 B2 * | 10/2018 | Goldman-Shenhar | B60W 50/10 |
| 2006/0155665 A1 | 7/2006 | Sekiyama | |
| 2007/0265844 A1 * | 11/2007 | Koyama | 704/E15.044 |
| 2013/0212050 A1 | 8/2013 | Sekiyama | |
| 2014/0136013 A1 | 5/2014 | Wolverton et al. | |
| 2014/0303827 A1 * | 10/2014 | Dolgov | B60W 60/0054 701/23 |
| 2015/0019074 A1 * | 1/2015 | Winter | B60K 37/06 704/231 |
| 2015/0025731 A1 * | 1/2015 | Uehara | B60W 50/10 701/23 |
| 2015/0066284 A1 | 3/2015 | Yopp | |
| 2015/0203119 A1 * | 7/2015 | Bird | B60W 50/087 701/90 |
| 2016/0170413 A1 | 6/2016 | Mueller | |

(Continued)

FOREIGN PATENT DOCUMENTS

| | | | |
|---|---|---|---|
| EP | 1 691 343 A1 | 8/2006 | |
| EP | 1 699 042 A1 | 9/2006 | |

(Continued)

*Primary Examiner* — Peter D Nolan
*Assistant Examiner* — Kenneth M Dunne
(74) *Attorney, Agent, or Firm* — Oblon, McClelland, Maier & Neustadt, L.L.P.

(57) ABSTRACT

An agent management device includes a processor including hardware, the processor being configured to: generate a response to an inquiry from an occupant of a moving body; determine whether or not a change in a control content of the moving body to correspond to the response is possible; output a question whether or not to execute the change to the control content to the occupant when determining that the change to the control content is possible; and execute the change to the control content when the occupant approves the change to the control content.

20 Claims, 5 Drawing Sheets

(56) References Cited

U.S. PATENT DOCUMENTS

| | | | |
|---|---|---|---|
| 2017/0016266 A1* | 1/2017 | Van Wiemeersch | B60K 37/06 |
| 2017/0096140 A1* | 4/2017 | Woodley | B60W 50/10 |
| 2017/0197636 A1* | 7/2017 | Beauvais | G06F 3/167 |
| 2018/0182385 A1* | 6/2018 | Stahl | G10L 15/19 |
| 2019/0114137 A1* | 4/2019 | Park | B60W 50/10 |

FOREIGN PATENT DOCUMENTS

| | | | | |
|---|---|---|---|---|
| EP | 1820684 A1 * | 8/2007 | | G07C 5/0816 |
| JP | 2006-195578 A | 7/2006 | | |
| KR | 20140039709 A * | 9/2012 | | |
| KR | 20140054652 A * | 10/2012 | | |
| KR | 10-1688762 B1 | 12/2016 | | |
| WO | WO-2016006385 A1 * | 1/2016 | | B60R 16/02 |

* cited by examiner

SYSTEM AND METHOD FOR VOICE COMMAND VEHICLE SYSTEMS CONTROL

The present application claims priority to and incorporates by reference the entire contents of Japanese Patent Application No. 2019-222932 filed in Japan on Dec. 10, 2019.

BACKGROUND

The present disclosure relates to an agent management device, a program, and an agent management method.

A technique for recommending optimum information to a user is known (see JP 2006-195578 A, for example). In this technique, a communication action with a user is determined based on a learning result of learning a driving situation of a vehicle and information obtained outside the vehicle accumulated in a mobile terminal device of the user, and recommendations such as explanation of operation functions are performed by an agent in which this communication action is personified.

SUMMARY

In JP 2006-195578 A described above, even when the operation function is explained by the agent in response to the user's inquiry, the user may not be able to understand the contents of the explanation of the operation function and make a determination. In this case, there is a problem that the user himself cannot execute the operation function explained by the agent.

There is a need for an agent management device, a program, and an agent management method capable of executing an operation function proposed in response to a user's inquiry on behalf of the user.

According to one aspect of the present disclosure, there is provided an agent management device including a processor including hardware, the processor being configured to: generate a response to an inquiry from an occupant of a moving body; determine whether or not a change in a control content of the moving body to correspond to the response is possible; output a question whether or not to execute the change to the control content to the occupant when determining that the change to the control content is possible; and execute the change to the control content when the occupant approves the change to the control content.

DETAILED DESCRIPTION

Figure 1:
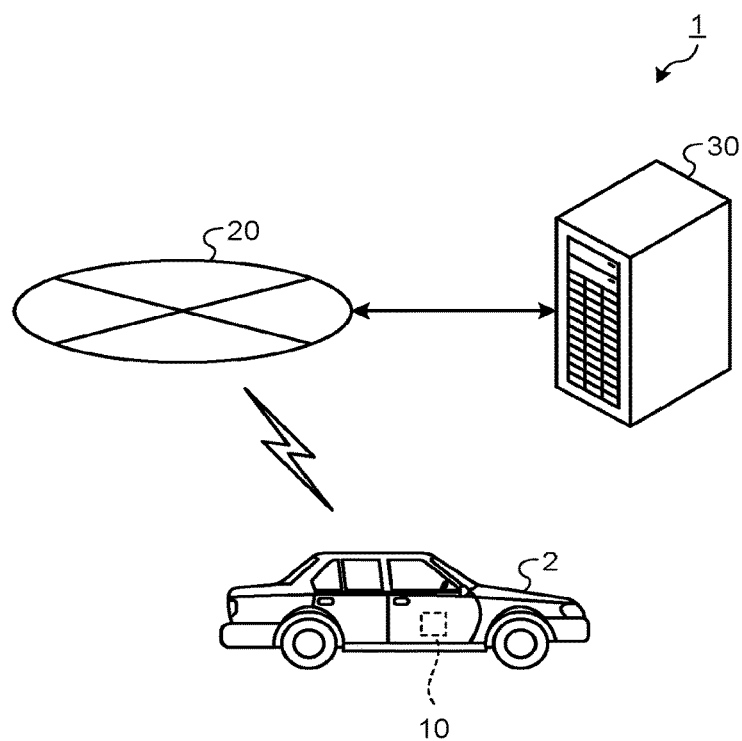
FIG. 1 is a schematic view illustrating a schematic configuration of a driver-assistance system according to an embodiment.

Hereinafter, an embodiment of the present disclosure will be described in detail with reference to the drawings. Note that the present disclosure is not limited to the following embodiment. Further, in the following description, the same parts will be denoted by the same reference numerals.

FIG. 1 is a schematic diagram illustrating a schematic configuration of a driver-assistance system according to an embodiment. A driver-assistance system 1 illustrated in FIG. 1 includes a driver-assistance device 10 mounted on a moving body 2, and an agent management device 30 that bidirectionally communicates with the driver-assistance device 10 via a network 20. This network 20 includes, for example, an Internet network or a mobile phone network. Further, in the following description, an automobile is used as an example of the moving body 2, but the moving body 2 is not limited to this, and may be a motorcycle, an electric kickboard, a drone, an airplane, a ship, a train, or the like.

Figure 2:
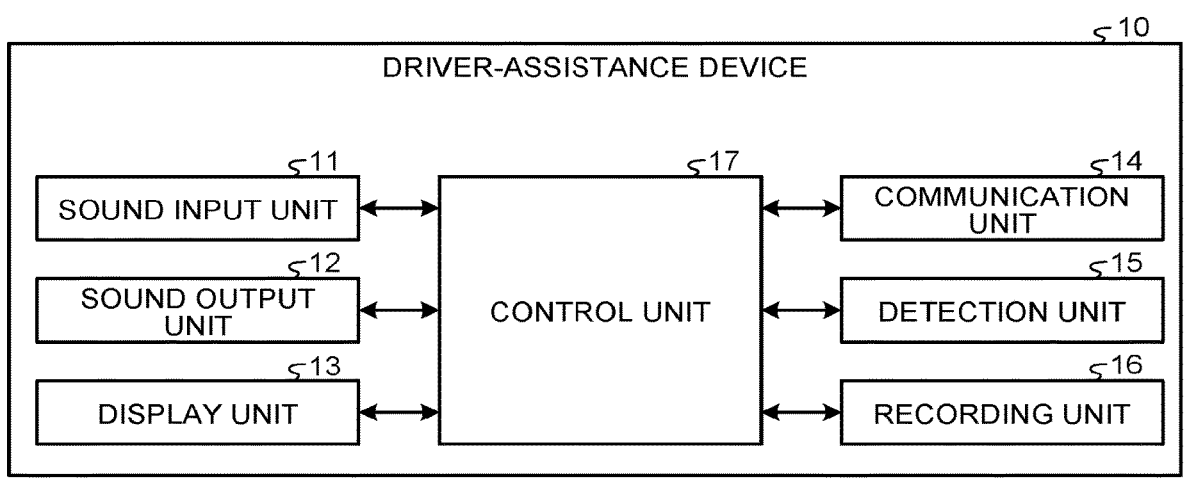
FIG. 2 is a block diagram illustrating a functional configuration of a driver-assistance device.

First, a description will be given of a functional configuration of the driver-assistance device 10. FIG. 2 is a block diagram illustrating the functional configuration of the driver-assistance device 10.

The driver-assistance device 10 illustrated in FIG. 2 is mounted on the moving body 2 and assists an operation of an occupant inside the moving body 2 during driving in cooperation with another Electronic Control Unit (ECU) mounted on the moving body 2. The driver-assistance device 10 includes a sound input unit 11, a sound output unit 12, a display unit 13, a communication unit 14, a detection unit 15, a recording unit 16, and a control unit 17.

The sound input unit 11 receives sound input from an occupant or the like and generates sound data by performing A/D conversion processing or the like on the received sound. The sound input unit 11 outputs the sound data to the control unit 17. The sound input unit 11 is realized by using a microphone that receives sound input and generates a sound signal, an amplifier that amplifies the analog sound signal input from the microphone, an A/D conversion circuit that converts the analog sound signal input from the amplifier into a digital sound signal, and the like.

The sound output unit 12 outputs sound corresponding to the sound signal input from the control unit 17. The sound output unit 12 is realized by a D/A conversion circuit that converts the digital sound signal input from the control unit 17 into an analog sound signal, an amplifier that amplifies the analog sound signal, a speaker that outputs sound corresponding to the sound signal input from the amplifier, and the like.

The display unit 13 displays various pieces of information under the control of the control unit 17. For example, the display unit 13 displays an explanation regarding the control operation of the moving body 2 under the control of the control unit 17. The display unit 13 is realized by using a display monitor such as an organic Electro Luminescence (EL) or liquid crystal or the like.

Under the control of the control unit 17, the communication unit 14 communicates with the agent management device 30 according to a predetermined communication standard. Here, the predetermined communication standard is, for example, 4G, 5G, Wireless Fidelity (Wi-Fi) (registered trademark) or Bluetooth (registered trademark). The communication unit 14 is realized by using a communication module enabling wireless communication.

The detection unit 15 detects the state of the moving body 2 and outputs the detection result to the control unit 17. Specifically, the detection unit 15 detects the current operation mode or state of the moving body 2 and outputs the detection result to the control unit 17. For example, the detection unit 15 detects an on/off state of traction control, which is one of a plurality of control operations that the moving body 2 can execute, and outputs the detection result to the control unit 17. The detection unit 15 is realized by using various sensors such as a sensor that detects rotation of wheels of the moving body 2 and a sensor that detects vehicle speed, a sensor that detects the on/off state of various actuators mounted on the moving body 2, an ECU, and the like.

The recording unit 16 records various pieces of information regarding the driver-assistance device 10, various programs executed by the driver-assistance device 10, and various pieces of information being processed by the control unit 17. Further, the recording unit 16 also records vehicle type information indicating the vehicle type of the moving body 2. The vehicle type information is a vehicle type name and a model year of the vehicle type. The recording unit 16 is realized by using a Dynamic Random Access Memory (DRAM), a Read Only Memory (ROM), a Flash memory, and the like.

The control unit 17 controls the operation of each unit included in the driver-assistance device 10. The control unit 17 is realized by using a memory and a processor having hardware such as a Central Processing Unit (CPU). Further, the control unit 17 changes the control of the moving body 2 according to the instruction signal input from the agent management device 30 via the communication unit 14. For example, the control unit 17 changes the traction control of the moving body 2 from the ON state to the OFF state when the instruction signal input from the agent management device 30 via the communication unit 14 is an instruction signal to turn off the traction control.

Figure 3:
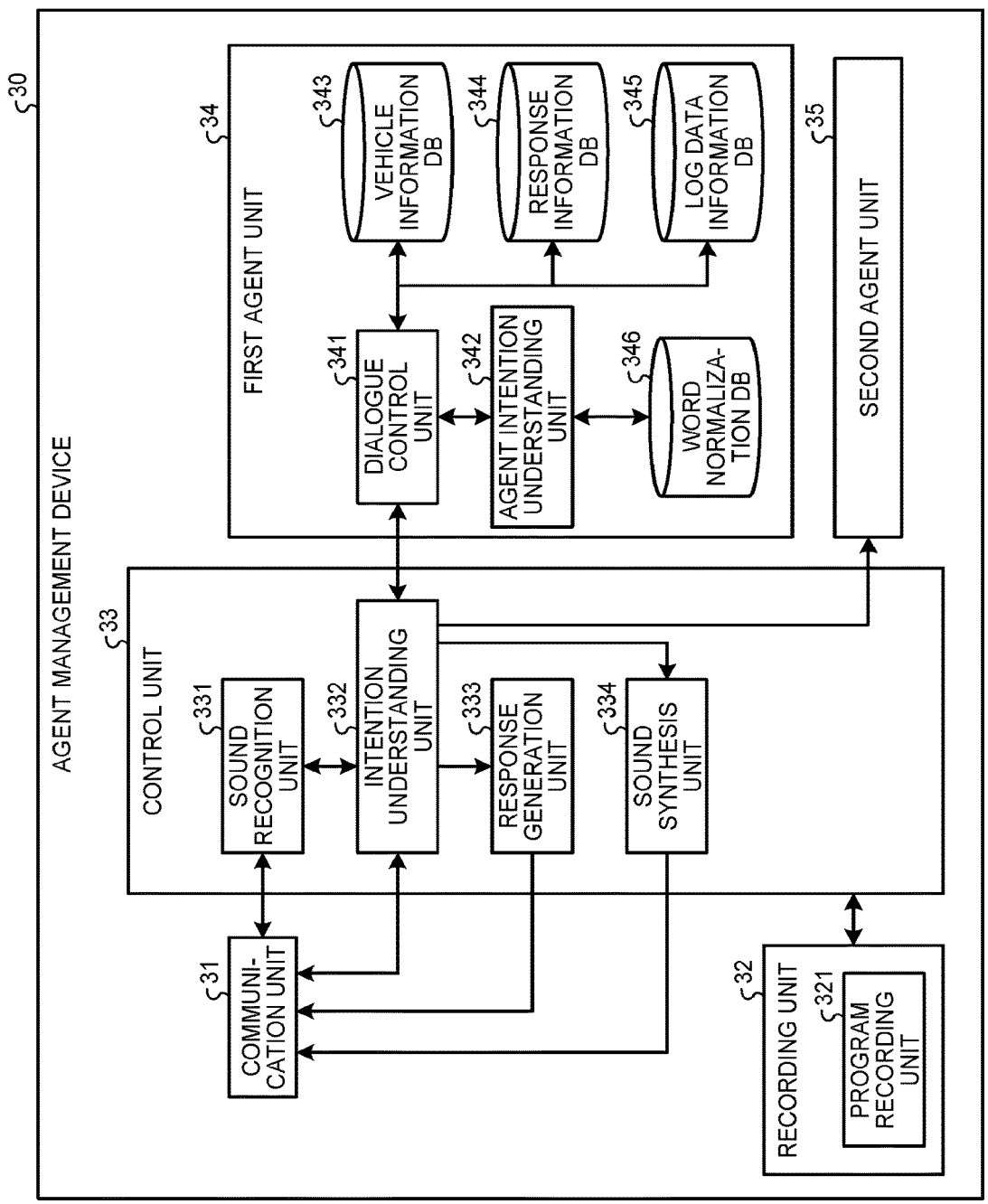
FIG. 3 is a block diagram illustrating a functional configuration of an agent management device.

Next, a functional configuration of the agent management device 30 will be described. FIG. 3 is a block diagram illustrating a functional configuration of the agent management device 30.

The agent management device 30 illustrated in FIG. 3 understands the intent of a question asked from an occupant via the network 20 and the driver-assistance device 10 mounted on and the moving body 2, responses according to the contents of the understood question, inquires of an occupant, and changes the control of the moving body 2. The agent management device 30 includes a communication unit 31, a recording unit 32, a control unit 33, a first agent unit 34, and a second agent unit 35.

Under the control of the control unit 33, the communication unit 31 communicates with the driver-assistance device 10 according to a predetermined communication standard. The communication unit 31 is realized by using a communication module enabling wireless communication.

The recording unit 32 records various programs executed by the agent management device 30 and various pieces of information being processed by the agent management device 30. The recording unit 32 is realized by using a hard disk drive (HDD), a solid state drive (SSD), a Flash memory, a DRAM, a ROM, and the like. The recording unit 32 includes a program recording unit 321 that records various programs executed by the agent management device 30.

The control unit 33 controls each unit included in the agent management device 30. The control unit 33 is configured using a processor having hardware such as a CPU, a field programmable gate array (FPGA), and an application specific integrated circuit (ASIC). The control unit 33 includes a sound recognition unit 331, an intention understanding unit 332, a response generation unit 333, and a sound synthesis unit 334.

The sound recognition unit 331 performs sound recognition on the sound signal input from the communication unit 31, and outputs the sound recognition result to the intention understanding unit 332. The sound recognition unit 331 converts, for example, the sound signal into text data and outputs the text data to the intention understanding unit 332. The sound recognition unit 331 is realized by using a well-known sound conversion technique.

The intention understanding unit 332 estimates the intention of inquiry (question) by an occupant as a processing intent ID (intent label) based on the sound recognition result input from the sound recognition unit 331. Here, the processing intent ID is a number that associates each of a plurality of control contents (operation functions) executable by the moving body 2 with a plurality of responses. Then, the intention understanding unit 332 selects an agent that can give an optimal response corresponding to the content of the estimated question from a plurality of agent units, and requests the selected agent unit to respond the occupant's inquiry. The intention understanding unit 332 is realized by using a learning model learned in advance for a plurality of questions. Specifically, the intention understanding unit 332 uses the text data converted by the sound recognition unit 331 as input data, estimates, as output data, an agent suitable for responding the content of the question from the plurality of agents, and outputs it. The intention understanding unit 332 is realized by using a learning model that, for example, performs machine learning using text data or sound data of a plurality of questions as teacher data in advance, and estimates (selects) and outputs an agent suitable for responding the content of the question from the plurality of agents as an output, and the like. The type of machine learning is not particularly limited, but, for example, the learning may be performed such that teacher data or learning data in which a question and a response are associated with each other is prepared, and this teacher data or learning data is input to a calculation model based on a multi-layer neural network. Further, as a machine learning method, for example, a method based on a deep neural network (DNN) of a multilayer neural network such as convolutional neural network (CNN) or 3D-CNN is used. Furthermore, when temporally continuous time series data such as sound data is an object, as a machine learning method, a method based on recurrent neural network (RNN) and a long short-term memory unit (LSTM) which is an extension of RNN is used.

The response generation unit 333 generates a response according to the processing intent ID indicating the control content (operation function) of the moving body 2 input from any of the plurality of agent units via the intention understanding unit 332, and outputs the response to the moving body 2 via the communication unit 31. Specifically, the response generation unit 333 selects the response according to the processing intent ID input via the intention understanding unit 332 from the plurality of responses respectively associated with the plurality of prerecorded processing intent IDs of the moving body 2. Then, the response generation unit 333 generates the response selected according to the processing intent ID input from the intention understanding unit 332 or a change signal for changing the control content of the moving body 2.

The sound synthesis unit 334 generates sound data according to the processing intent ID input from the intention understanding unit 332, and outputs this sound data to the moving body 2 via the communication unit 31. Specifically, the sound synthesis unit 334 selects the sound data corresponding to the processing intent ID input from the intention understanding unit 332 from a plurality of sound data respectively associated with the plurality of prerecorded control contents. Then, the sound synthesis unit 334 generates the sound data selected according to the processing intent ID input from the intention understanding unit 332.

The first agent unit 34 estimates the information about the control change of the moving body 2 corresponding to the response to the occupant's inquiry input from the intention understanding unit 332, and outputs the estimation result to the intention understanding unit 332. The first agent unit 34 includes a dialogue control unit 341 and an agent intention understanding unit 342. Furthermore, the first agent unit 34 includes a vehicle information database 343 (hereinafter, referred to as "vehicle information DB 343"), a response information database 344 (hereinafter, referred to as "response information DB333"), a log data information database 345 (hereinafter, referred to as "log data information DB 345"), and a word normalization database 346 (hereinafter referred to as "word normalization DB 346").

The dialogue control unit 341 controls a dialogue and a human machine interface (HMI) according to the occupant's inquiry input from the intention understanding unit 332. The dialogue control unit 341 is realized by using a processor having CPU hardware and the like.

The agent intention understanding unit 342 estimates a processing intent ID corresponding to the occupant's inquiry (question) based on the sound recognition result input from the sound recognition unit 331 via the dialogue control unit 341 and the intention understanding unit 332. Specifically, the agent intention understanding unit 342 refers to the vehicle information DB 343, the response information DB 344, the log data information DB 345, and the word normalization DB 346, which will be described later, and estimates a processing intent ID according to the occupant's inquiry (question). The agent intention understanding unit 342 outputs the estimated processing intent ID to the response generation unit 333 via the dialogue control unit 341 and the intention understanding unit 332. The agent intention understanding unit 342 is realized by using a learning model learned in advance for a plurality of questions. Specifically, the agent intention understanding unit 342 uses the text data converted by the sound recognition unit 331 as input data, estimates, as output data, a processing intent ID corresponding to the response corresponding to the occupant's inquiry, and outputs it.

The vehicle information DB 343 records vehicle information with which the vehicle type, the year, and the operation manual of the moving body 2 are associated. The vehicle information DB 343 is realized by using a solid state drive (SSD), a hard disk drive (HDD), and the like.

The response information DB 344 records response information for replying corresponding to each of the plurality of processing intent IDs. The response information DB 344 is realized by using an SSD, an HDD, and the like.

The log data information DB 345 records operation information indicating the operation content of an occupant, response information indicating the response content of the first agent unit 34, and the like. The log data information DB 345 is realized by using an SSD, an HDD, and the like.

The word normalization DB 346 records data for normalizing words used by the agent intention understanding unit 342 in preprocessing for intention understanding. The word normalization DB 346 is realized by using an SSD, an HDD, and the like.

The second agent unit 35 estimates the information about other changes of the moving body 2 corresponding to the response to the occupant's inquiry input from the intention understanding unit 332, and outputs the estimation result to the intention understanding unit 332. Here, the other changes are, for example, music changes, destination changes by navigation, and the like. Since the second agent unit 35 has the same configuration as the first agent unit 34, detailed description of the configuration is omitted.

Figure 4:
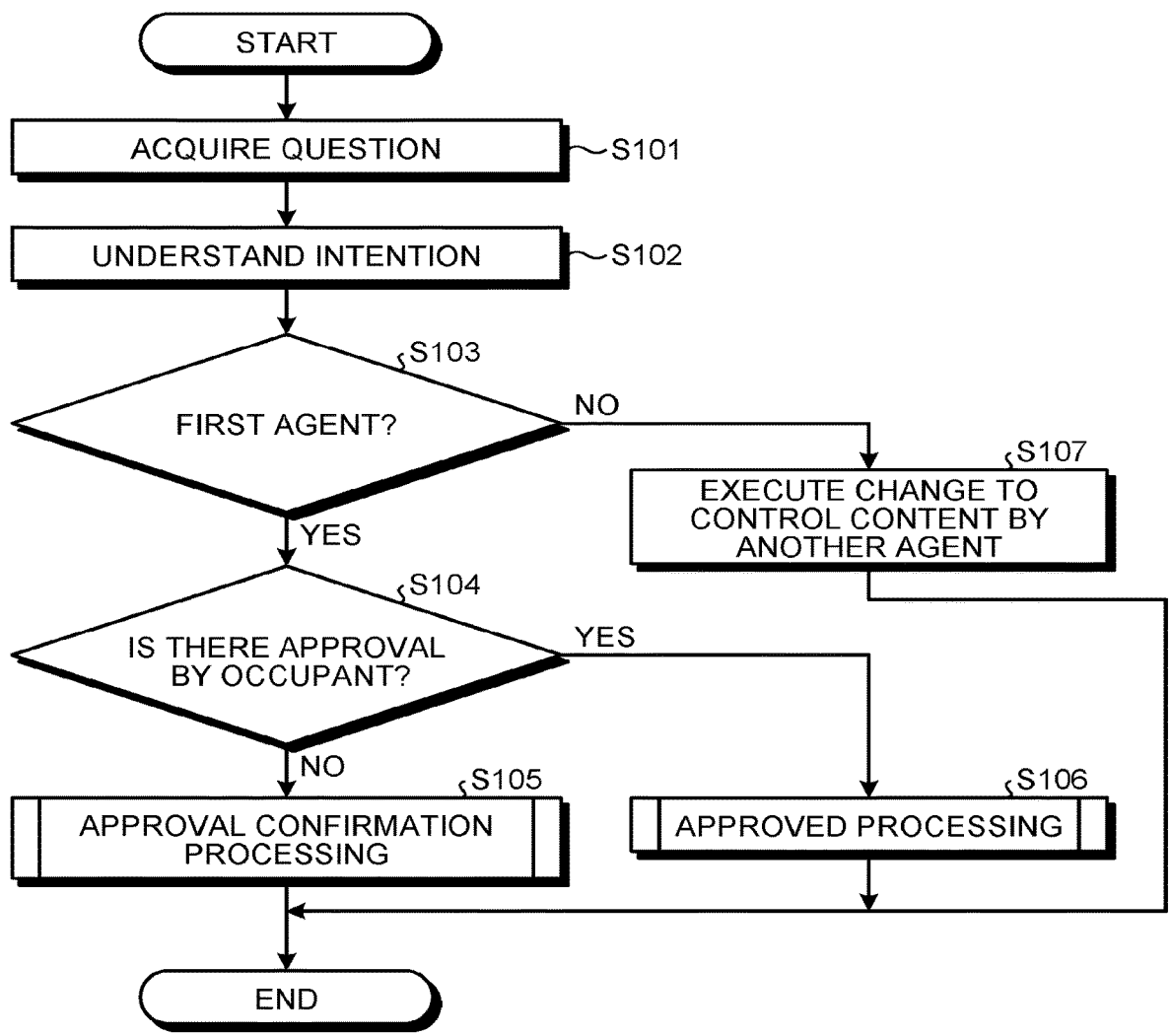
FIG. 4 is a flowchart illustrating an outline of processing executed by the agent management device.

Next, the processing by the agent management device 30 will be described. FIG. 4 is a flowchart illustrating an outline of processing executed by the agent management device 30. In the following, processing in a state where an occupant of the moving body 2 inquires of the agent management device 30, for example, the occupant inquires as "agent", and the agent management device 30 is activated will be described.

As illustrated in FIG. 4, first, the sound recognition unit 331 acquires the question asked by the occupant of the moving body 2 via the communication unit 31 (Step S101). Specifically, the sound recognition unit 331 acquires the sound signal of the question asked by the occupant of the moving body 2 via the communication unit 31. In this case, the sound recognition unit 331 performs sound recognition on the sound signal of the question asked by the occupant of the moving body 2, which is acquired via the communication unit 31.

Subsequently, the intention understanding unit 332 understands the intention of the question asked by the occupant based on the sound recognition result input from the sound recognition unit 331 (Step S102).

Then, the intention understanding unit 332 estimates whether or not the inquiry from the occupant is the first agent unit 34 that can respond to the intent regarding the control content of the moving body 2 (Step S103). When it is estimated that the inquiry from the occupant is the first agent unit 34 corresponding to the content regarding the control content of the moving body 2 (Step S103: Yes), the agent management device 30 proceeds to Step S104 described later. On the other hand, when it is estimated that the inquiry from the occupant is not the first agent unit 34 capable of responding the content regarding the control content of the moving body 2 (Step S103: No), the agent management device 30 proceeds to Step S107 described later.

In Step S104, the intention understanding unit 332 estimates whether or not the content that approves the change of the control content of the moving body 2 is included in the inquiry from the occupant based on the sound recognition result input from the sound recognition unit 331. When it is estimated by the intention understanding unit 332 that the content that approves the change of the control content of the moving body 2 is included in the inquiry from the occupant (Step S104: Yes), the agent management device 30 proceeds to Step S106 described below. For example, when the content of the inquiry from the occupant is "Vehicle slips on a snowy road and cannot travel. You may turn off traction control", "You may turn off traction control" is included, and hence the intention understanding unit 332 estimates that approval for changing the control content of the moving body 2 is included. On the other hand, when it is estimated by the intention understanding unit 332 that the content that approves the change of the control content of the moving body 2 is not included in the inquiry from the occupant (Step S104: No), the agent management device 30 proceeds to Step S105 described below. For example, when the content of the inquiry from the occupant is "Vehicle slips on a snowy road and cannot travel", the intention understanding unit 332 estimates that the approval for changing the control content of the moving body 2 is not included.

In Step S105, the agent management device 30 asks the occupant whether or not to change the control content of the moving body 2 corresponding to the response to the occupant's inquiry, and when the occupant approves it, the agent management device 30 executes approval confirmation processing of changing the control content of the moving body 2. After Step S105, the agent management device 30 ends this processing. The details of the approval confirmation processing will be described later.

In Step S106, the agent management device 30 estimates that approval has been obtained from the occupant, does not output a question as to whether or not to execute the change to the control content of the moving body 2 to the occupant, and executes approved processing of changing the control content of the moving body 2. After Step S106, the agent management device 30 ends this processing. The details of the approved processing will be described later.

In Step S107, the second agent unit 35 executes change to a control content by another agent estimated by the intention understanding unit 332. For example, in a case where the question by the occupant is "play music", when sound data is not played in the moving body 2, the second agent unit 35 executes change to a control content of transmitting music data to the moving body 2 and reproducing it. After Step S107, the agent management device 30 ends this processing.

Figure 5:
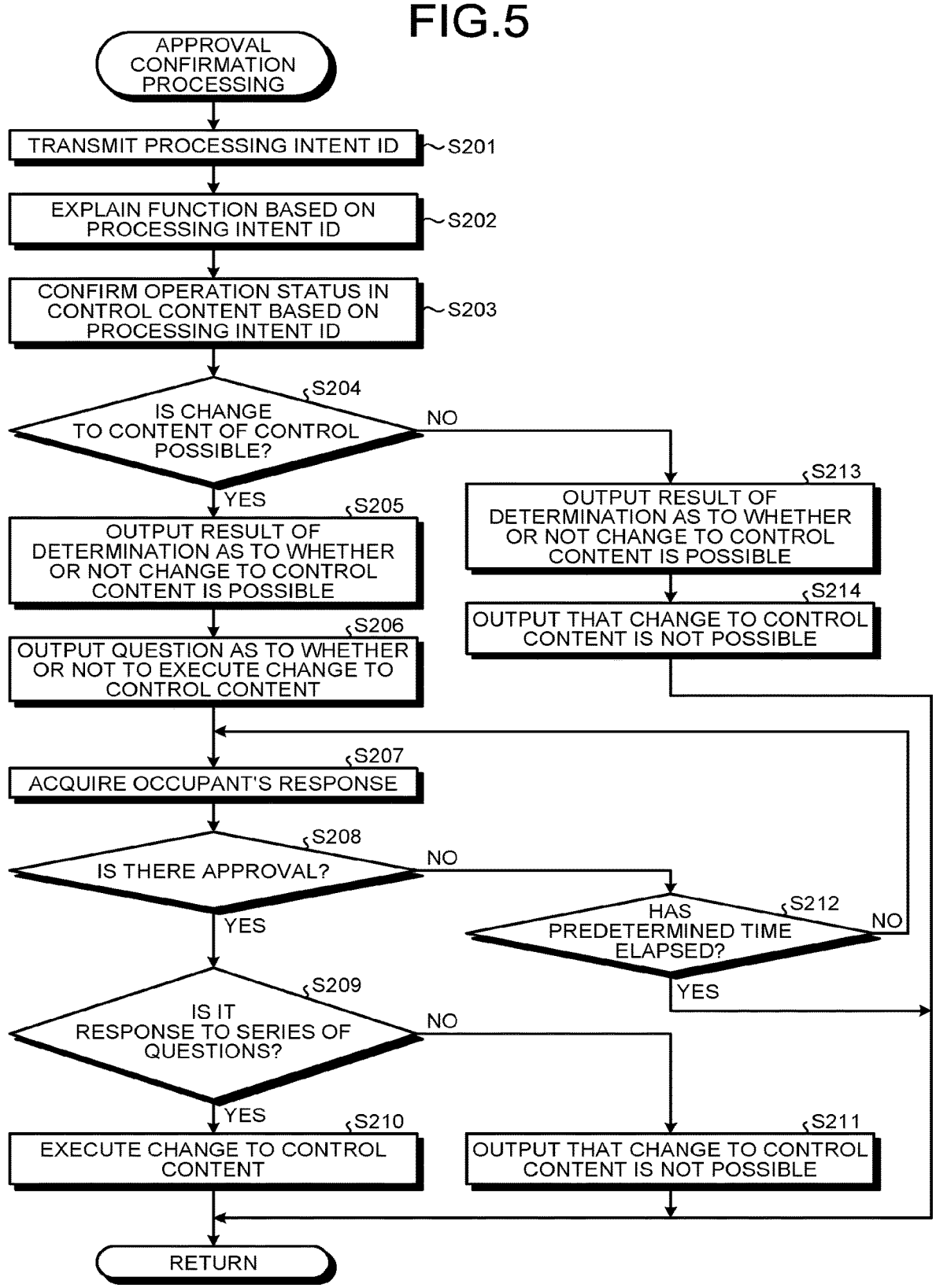
FIG. 5 is a flowchart illustrating an outline of approval confirmation processing of FIG. 4.

Next, details of the approval confirmation processing described in Step S105 of FIG. 4 will be described. FIG. 5 is a flowchart illustrating an outline of the approval confirmation processing.

As illustrated in FIG. 5, the intention understanding unit 332 transmits a processing intent ID indicating the estimation result of estimating the control content of the moving body 2 corresponding to the response to the inquiry from the occupant to the first agent unit 34 (Step S201).

Subsequently, the first agent unit 34 explains the function of the processing intent ID based on the processing intent ID estimated by the intention understanding unit 332 (Step S202). Specifically, first, the agent intention understanding unit 342 estimates whether or not it is related to the moving body 2 or the control content of the moving body 2 based on the processing intent ID. Then, the dialogue control unit 341 acquires a response corresponding to the processing intent ID from one of the vehicle information DB 343 and the response information DB 344 based on the estimation result of the agent intention understanding unit 342. After acquiring the circuit, the dialogue control unit 341 outputs a response regarding the function of the acquired processing intent ID to the response generation unit 333. In this case, the response generation unit 333 generates text data of the response regarding the function of the processing intent ID, and transmits this text data to the driver-assistance device 10 via the communication unit 31. Further, the sound synthesis unit 334 generates sound data of the response regarding the function of the processing intent ID, and transmits the sound data to the driver-assistance device 10 via the communication unit 31. In this case, the control unit 17 of the driver-assistance device 10 receives the text data and the sound data via the communication unit 14, displays the information corresponding to the received text data on the display unit 13, and causes the sound output unit 12 to output sound corresponding to the sound data. For example, the control unit 17 causes the sound output unit 12 to output as sound, "If the traction control is turned off, it will be easier to escape from the snowy road".

The dialogue control unit 341 confirms the operation status of the moving body 2 having the control content corresponding to the processing intent ID based on the processing intent ID (Step S203). Specifically, the dialogue control unit 341 acquires the current operation status of the moving body 2 from the driver-assistance device 10 via the communication unit 31. More specifically, the dialogue control unit 341 acquires the current operation mode of the moving body 2, for example, the on/off status of traction control, from the driver-assistance device 10 via the communication unit 31. Note that the dialogue control unit 341 may acquire the current operation status of the moving body 2 not only from the driver-assistance device 10 but also from, for example, an external server to which the driver-assistance device 10 sequentially transmits the operation status of the moving body 2 at predetermined intervals.

Subsequently, the dialogue control unit 341 determines whether or not the change to the control content corresponding to the processing intent ID is possible based on the current operation status of the moving body 2 (Step S204). When the dialogue control unit 341 determines that the change to the control content corresponding to the processing intent ID is possible (Step S204: Yes), the agent management device 30 proceeds to Step S205 described later. On the other hand, when it is determined that the change to the control content corresponding to the processing intent ID is not possible (Step S204: No), the agent management device 30 proceeds to Step S212 described later.

In Step S205, the dialogue control unit 341 outputs the result of determination as to whether or not the change to the control content corresponding to the processing intent ID is possible to the control unit 33. In this case, the dialogue control unit 341 outputs information indicating that the change to the control content corresponding to the processing intent ID is possible to the control unit 33.

Subsequently, the control unit 33 outputs a question as to whether or not to execute the change to the control content corresponding to the processing intent ID to the driver-assistance device 10 (Step S206). Specifically, the response generation unit 333 generates text data for asking whether or not execute the change to the control content corresponding to the processing intent ID, and transmits this text data to driver-assistance device 10 via the communication unit 31. Further, the sound synthesis unit 334 generates sound data for asking whether or not execute the change to the control content corresponding to the processing intent ID, and transmits this sound data to driver-assistance device 10 via the communication unit 31. In this case, the control unit 17 of the driver-assistance device 10 receives the text data and the sound data via the communication unit 14, displays the information corresponding to the received text data on the display unit 13, and causes the sound output unit 12 to output sound corresponding to the sound data. For example, the control unit 17 causes the sound output unit 12 to output "Shall I turn it off?" as sound.

Then, the intention understanding unit 332 acquires the occupant's response from the driver-assistance device 10 via the communication unit 31 (Step S207), and estimates whether or not the occupant's response is approved (Step S208). When the intention understanding unit 332 estimates that the response from the occupant is approved (Step S208: Yes), the agent management device 30 proceeds to Step S209 described later. For example, the intention understanding unit 332 estimates that the response from the occupant is approved when the response from the occupant includes "please", "OK", "do", and "execute". On the other hand, when the intention understanding unit 332 estimates that the response from the occupant is not approved (Step S208: No), the agent management device 30 proceeds to Step S212 described later.

In Step S209, the intention understanding unit 332 estimates whether or not the occupant's response is approval of the series of questions. For example, the intention understanding unit 332 estimates whether or not the occupant's response is the approval corresponding to the content asked by the agent management device 30 within a fixed time (for example, within 5 seconds). When the intention understanding unit 332 estimates that the occupant's response is the approval of the series of questions (Step S209: Yes), the agent management device 30 proceeds to Step S210 described later. On the other hand, when the intention understanding unit 332 estimates that the occupant's response is not the approval of the series of questions (Step S209: No), the agent management device 30 proceeds to Step S211 described later.

In Step S210, the response generation unit 333 executes the change to the control content corresponding to the processing intent ID. Specifically, the response generation unit 333 transmits a change signal for executing the change to the control content corresponding to the processing intent ID to the driver-assistance device 10 of the moving body 2 via the communication unit 31. In this case, the control unit 17 of the driver-assistance device 10 changes the state of the moving body 2 to the control content corresponding to the change signal received from the agent management device 30 via the communication unit 14. For example, when the driver-assistance device 10 receives a change signal for changing the state of the traction control of the moving body 2 to the off state input from the agent management device 30, the driver-assistance device 10 changes the traction control of the moving body 2 to the off state. In this case, the sound synthesis unit 334 generates sound data indicating that the change to the control content corresponding to the processing intent ID is executed, and transmits this sound data to driver-assistance device 10 via the communication unit 31. Then, the driver-assistance device 10 causes the sound output unit 12 to output sound corresponding to the sound data received from the agent management device 30, for example, "Sure". Thereby, the occupant can grasp that the traction control of the moving body 2 is brought into the off state under the control of the agent management device 30. After Step S210, the agent management device 30 returns to the main routine of FIG. 4 and ends this processing.

In Step S211, since the response of the occupant is an unintended response, the sound synthesis unit 334 outputs that the change to the control content corresponding to the processing intent ID is not possible. Specifically, the sound synthesis unit 334 generates sound data indicating that the operation of the control corresponding to the processing intent ID cannot be changed, and outputs this sound data to the driver-assistance device 10 via the communication unit 31. In this case, the driver-assistance device 10 causes the sound output unit 12 to output sound corresponding to the sound data received from the agent management device 30, for example, "I cannot assist you, sorry" via the communication unit 14. After Step S211, the agent management device 30 returns to the main routine of FIG. 4 and ends this processing.

In Step S212, when a predetermined time (for example, 3 seconds) has elapsed since the occupant's response was obtained from the driver-assistance device 10 via the communication unit 31 (Step S212: Yes), the agent management device 30 returns to the main routine of FIG. 4 and ends this processing. On the other hand, when the predetermined time has not elapsed since the occupant's response was obtained from the driver-assistance device 10 via the communication unit 31 (Step S212: No), the agent management device 30 returns to Step S207.

In Step S213, the dialogue control unit 341 outputs the result of determination as to whether or not the change to the control content corresponding to the processing intent ID is possible to the control unit 33. In this case, the dialogue control unit 341 outputs information indicating that the change to the control content corresponding to the processing intent ID is not possible to the control unit 33.

Subsequently, the sound synthesis unit 334 outputs that the change to the control content corresponding to the processing intent ID is not possible (Step S214). Specifically, the sound synthesis unit 334 generates sound data indicating that the operation of the control corresponding to the processing intent ID cannot be changed, and outputs this sound data to the driver-assistance device 10 via the communication unit 31. In this case, the driver-assistance device 10 causes the sound output unit 12 to output sound corresponding to the sound data received from the agent management device 30, for example, "I cannot assist you, sorry" via the communication unit 14. After Step S214, the agent management device 30 returns to the main routine of FIG. 4 and ends this processing.

Figure 6:
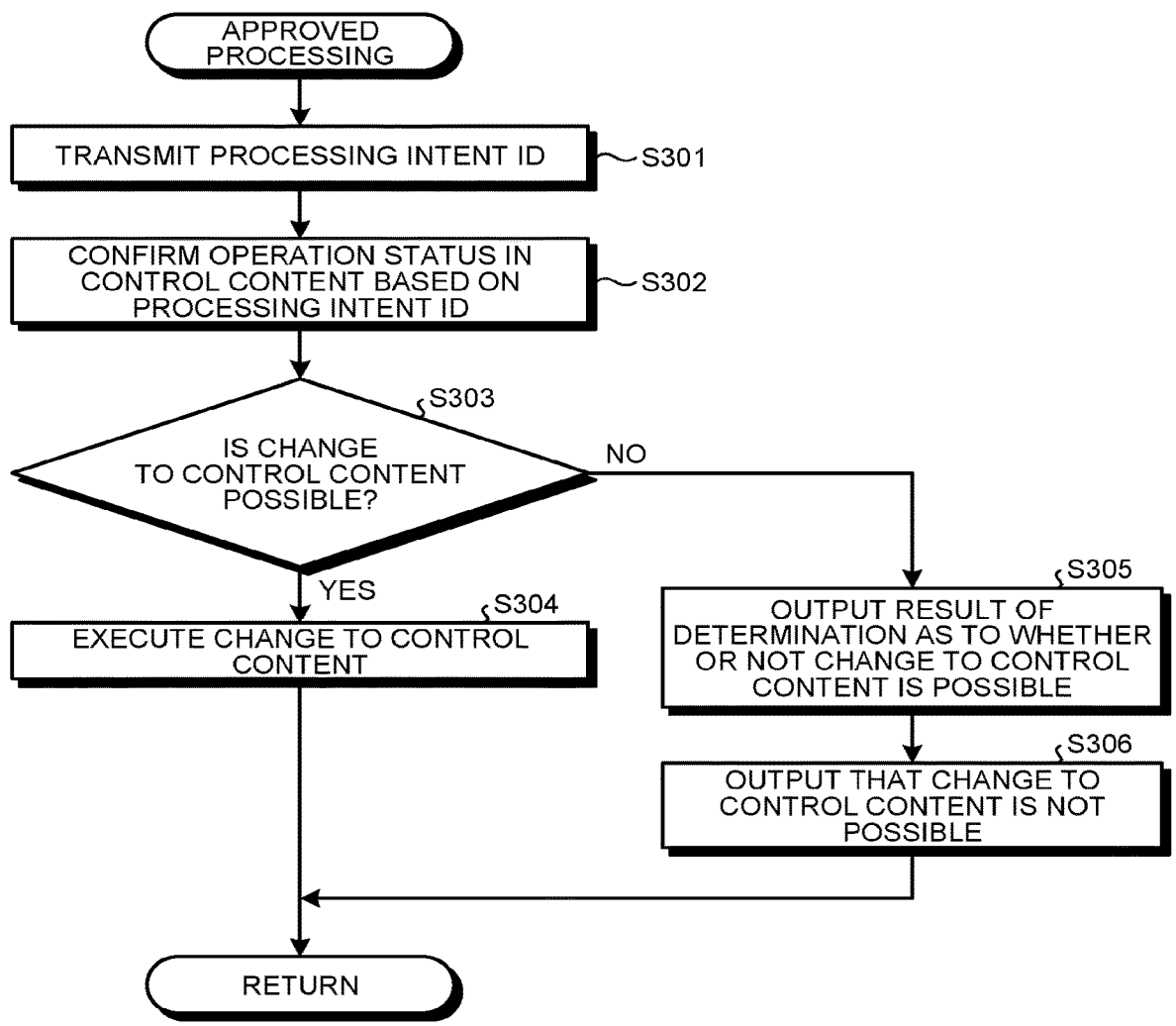
FIG. 6 is a flowchart illustrating an outline of approved processing of FIG. 4.

Next, details of the approved processing described in Step S106 of FIG. 4 will be described. FIG. 6 is a flowchart illustrating an outline of the approved processing.

As illustrated in FIG. 6, first, the intention understanding unit 332 transmits a processing intent ID indicating the estimation result of estimating the control change of the moving body 2 corresponding to the response to the inquiry from the occupant to the first agent unit 34 (Step S301).

Subsequently, the dialogue control unit 341 confirms the operation status of the moving body 2 having the control content corresponding to the processing intent ID based on the processing intent ID (Step S302).

Then, the dialogue control unit 341 determines whether or not the change to the control content corresponding to the processing intent ID is possible based on the current operation status of the moving body 2 (Step S303). When the dialogue control unit 341 determines that the operation of the control corresponding to the processing intent ID can be changed (Step S303: Yes), the agent management device 30 proceeds to Step S304 described later. On the other hand, when it is determined that the change to the control content corresponding to the processing intent ID is not possible (Step S303: No), the agent management device 30 proceeds to Step S305 described later.

In Step S304, the response generation unit 333 executes the change to the control content corresponding to the processing intent ID. Specifically, the response generation unit 333 outputs a change signal for executing the change to the control content corresponding to the processing intent ID to the driver-assistance device 10 of the moving body 2 via the communication unit 31. In this case, the control unit 17 of the driver-assistance device 10 changes the state of the moving body 2 to the control content corresponding to the change signal received from the agent management device 30 via the communication unit 14. For example, when the driver-assistance device 10 receives a change signal for changing the state of the traction control of the moving body 2 to the off state input from the agent management device 30, the driver-assistance device 10 changes the traction control of the moving body 2 to the off state. In this case, the sound synthesis unit 334 generates sound data indicating that the change to the control content corresponding to the processing intent ID is executed, and transmits this sound data to driver-assistance device 10 via the communication unit 31. Then, the driver-assistance device 10 causes the sound output unit 12 to output sound corresponding to the sound data received from the agent management device 30, for example, "Sure". Thereby, the occupant can grasp that the traction control of the moving body 2 is brought into the off state under the control of the agent management device 30. After Step S210, the agent management device 30 returns to the main routine of FIG. 4 and ends this processing.

Step S305 and Step S306 correspond to the above-described Step S213 and Step S214 in FIG. 5, respectively. After Step S306, the agent management device 30 returns to the main routine of FIG. 4 and ends this processing.

According to the embodiment described above, the agent management device 30 determines whether or not the change of the control content of the moving body 2 or the change of the control content of the moving body 2 corresponding to the response to the inquiry from the occupant is possible. Then, when the agent management device 30 determines that the change of the control content of the moving body 2 is possible, the agent management device 30 outputs a question as to whether or not to execute the control change of the moving body 2 to the occupant. Then, when the occupant approves the change to the control content, the agent management device 30 executes the change to the control content of the moving body 2 corresponding to the response to the inquiry from the occupant. Therefore, the operation content proposed in response to the user's inquiry can be executed on behalf of the user with the user's approval. As a result, the difficulty level of the driving operation of the moving body 2 can be reduced.

Further, according to the embodiment, the agent management device 30 determines whether or not the inquiry from the occupant includes a content that approves the change to the control content of the moving body 2. When the agent management device 30 determines that the approval of the occupant is included, the agent management device 30 does not output a question as to whether or not to execute the change to the control content to the occupant, and executes the change to the control content of the moving body 2 corresponding to the response to the inquiry from the occupant. As a result, change to the control content of the moving body 2 instructed by the occupant can be smoothly executed.

Further, according to the embodiment, the agent management device 30 estimates whether or not the inquiry from the occupant is a content related to the control content of the moving body 2. Then, when the agent management device 30 estimates that the inquiry is the content related to the control content of the moving body 2, the agent management device 30 determines whether or not the change to the control content of the moving body 2 corresponding to the response to the inquiry from the occupant is possible. For this reason, it is possible to select an agent suitable for the response for changing the control content of the moving body 2 from a plurality of agents, so that the agent management device 30 can smoothly respond to the content of the control change of the moving body 2 asked by the occupant.

Further, according to the embodiment, after the agent management device 30 determines that the change to the control content of the moving body 2 corresponding to the response to the inquiry from the occupant is possible, the agent management device 30 gives an explanation about the control content of the moving body 2 to the occupant. Thereby, the occupant can grasp the control content of the moving body 2.

Further, according to the embodiment, the agent management device 30 acquires the operation status of the moving body 2 and determines whether or not the change of the control content of the moving body 2 is possible based on the operation status of the moving body 2. Then, when the agent management device 30 determines that the change to the control content of the moving body 2 corresponding to the response to the inquiry from the occupant is possible, the agent management device 30 changes the control content of the moving body 2. Therefore, change to the control content of the moving body 2 approved by the occupant can be smoothly executed.

Further, according to the embodiment, after the agent management device 30 outputs a question as to whether or not to execute the change to the control content of the moving body 2 to the occupant, the agent management device 30 determines whether or not the response from the occupant is a series of responses for approving the change to the control content of the moving body 2. Then, when the response is the series of responses, the agent management device 30 executes the change to the control content of the moving body 2 corresponding to the response to the inquiry from the occupant. As a result, it is possible to prevent the control change that is not intended by the occupant from being executed.

Further, according to the embodiment, after the agent management device 30 inquires of the occupant as to whether or not to change the control content of the moving body 2, when the occupant approves the change to the control content of the moving body 2 within a predetermined time, the agent management device 30 outputs a response that the change to the control content is executed. On the other hand, when the occupant does not approve the change to the control content within the predetermined time, the agent management device 30 outputs a response that the control content of the moving body 2 is not changed. As a result, the occupant can grasp the result of changing the control content by the agent management device 30.

Also, in the above-mentioned embodiment, the aforementioned "units" can be replaced with "circuits". For example, the control unit can be replaced with a control circuit.

Also, a program to be executed by the agent management device according to the above-mentioned embodiment is provided by recording installable or executable file data on a computer-readable recording medium such as a CD-ROM, a flexible disk (FD), a CD-R, a digital versatile disk (DVD), a USB medium, and a flash memory.

Also, the program to be executed by the agent management device according to the above-mentioned embodiment may be provided by storing the program on a computer connected to a network such as the Internet and downloading the program via the network.

Meanwhile, in the description of the flowcharts in the present specification, although the expressions "first", "then", "subsequently", and the like are used to clarify a processing order of the steps, the processing order required to carry out the present embodiment shall not be defined uniquely by these expressions. Thus, the order of processing in the flowcharts described herein can be changed without contradiction.

According to the present disclosure, there is obtained an effect of being capable of executing an operation function proposed in response to a user's inquiry on behalf of the user.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An agent management device comprising
a processor comprising hardware, the processor being configured to:
generate a response to an inquiry from an occupant of a moving body;
determine whether or not a change in a control content of the moving body to correspond to the response is possible;
determine whether or not the inquiry from the occupant includes content that approves the change of the control content;
estimate the control content corresponding to the inquiry from the occupant when it is determined that the inquiry from the occupant does not include the content that approves the change of the control content;
output the estimated control content;
output a question whether or not to execute the change to the control content to the occupant when determining that the change to the control content is possible;
execute the change to the control content when the occupant approves the change to the control content; and
control an operation of the moving body based on the changed control content.

2. The agent management device according to claim 1, wherein the processor is configured to:
determine whether or not the inquiry includes a content approving the change to the control content; and
execute the change to the control content without outputting the question when determining that the inquiry includes the content approving the change to the control content.

3. The agent management device according to claim 1, wherein the processor is configured to:
estimate whether or not the inquiry relates to the control content; and
determines whether or not the change to the control content is possible when the inquiry is estimated to relate to the control content.

4. The agent management device according to claim 1, wherein the processor is configured to output an explanation about the control content to the occupant after determining that the change to the control content is possible.

5. The agent management device according to claim 1, wherein the processor is configured to:
acquire an operation status of the moving body;
determine whether or not the change to the control content is possible based on the operation status; and
execute the change to the control content when determining that the change to the control content is possible.

6. The agent management device according to claim 1, wherein the processor is configured to:
determine whether or not the response includes a series of responses for approving the change to the control content after the processor outputs the question; and
execute the change to the control content when determining that the response includes the series of responses.

7. The agent management device according to claim 1, wherein the processor is configured to:
output a response that the change to the control content is executed after the processor outputs the question when the occupant approves the change to the control content within a predetermined time; and
outputs a response that the change to the control content is not executed when the occupant does not approve the change to the control content within the predetermined time.

8. A non-transitory computer-readable recording medium on which an executable program is recorded, the program causing a processor of a computer to execute:
generating a response to an inquiry from an occupant of a moving body;
determining whether or not a change in a control content of the moving body to correspond to the response is possible;
determining whether or not the inquiry from the occupant includes content that approves the change of the control content;
estimating the control content corresponding to the inquiry from the occupant when it is determined that the inquiry from the occupant does not include the content that approves the change of the control content;
outputting the estimated control content;
outputting a question whether or not to execute the change to the control content to the occupant when determining that the change to the control content is possible;
executing the change to the control content when the occupant approves the change to the control content; and
controlling an operation of the moving body based on the changed control content.

9. The non-transitory computer-readable recording medium according to claim 8, wherein the program causes the processor to execute:
determining whether or not the inquiry includes a content approving the change to the control content; and
executing the change to the control content without outputting the question when determining that the inquiry includes the content approving the change to the control content.

10. The non-transitory computer-readable recording medium according to claim 8, wherein the program causes the processor to execute:
estimating whether or not the inquiry relates to the control content; and
determining whether or not the change to the control content is possible when the inquiry is estimated to relate to the control content.

11. The non-transitory computer-readable recording medium according to claim 8, wherein the program causes the processor to execute outputting an explanation about the control content to the occupant after determining that the change to the control content is possible.

12. The non-transitory computer-readable recording medium according to claim 8, wherein the program causes the processor to execute:
acquiring an operation status of the moving body;
determining whether or not the change to the control content is possible based on the operation status; and
executing the change to the control content when determining that the change to the control content is possible.

13. The non-transitory computer-readable recording medium according to claim 8, wherein the program causes the processor to execute:
determining whether or not the response includes a series of responses for approving the change to the control content after the processor outputs the question; and executing the change to the control content when determining that the response includes the series of responses.

14. The non-transitory computer-readable recording medium according to claim 8, wherein the program causes the processor to execute:
   outputting a response that the change to the control content is executed after the processor outputs the question when the occupant approves the change to the control content within a predetermined time; and
   outputting a response that the change to the control content is not executed when the occupant does not approve the change to the control content within the predetermined time.

15. An agent management method comprising:
   generating a response to an inquiry from an occupant of a moving body;
   determining whether or not a change in a control content of the moving body to correspond to the response is possible;
   determining whether or not the inquiry from the occupant includes content that approves the change of the control content;
   estimating the control content corresponding to the inquiry from the occupant when it is determined that the inquiry from the occupant does not include the content that approves the change of the control content;
   outputting the estimated control content;
   outputting a question whether or not to execute the change to the control content to the occupant when determining that the change to the control content is possible;
   executing the change to the control content when the occupant approves the change to the control content; and
   controlling an operation of the moving body based on the changed control content.

16. The agent management method according to claim 15, comprising:
   determining whether or not the inquiry includes a content approving the change to the control content; and
   executing the change to the control content without outputting the question when determining that the inquiry includes the content approving the change to the control content.

17. The agent management method according to claim 15, comprising:
   estimating whether or not the inquiry relates to the control content; and
   determining whether or not the change to the control content is possible when the inquiry is estimated to relate to the control content.

18. The agent management method according to claim 15, comprising outputting an explanation about the control content to the occupant after determining that the change to the control content is possible.

19. The agent management method according to claim 15, comprising:
   acquiring an operation status of the moving body;
   determining whether or not the change to the control content is possible based on the operation status; and
   executing the change to the control content when determining that the change to the control content is possible.

20. The agent management method according to claim 15, comprising:
   determining whether or not the response includes a series of responses for approving the change to the control content after the processor outputs the question; and
   executing the change to the control content when determining that the response includes the series of responses.

* * * * *